United States Patent [19]
Kraft

[11] 4,277,240
[45] Jul. 7, 1981

[54] HYDRAULIC BELT TENSIONER CONSTRUCTION

[75] Inventor: Derald H. Kraft, Canton, Ohio

[73] Assignee: Dyneer Corporation, Canton, Ohio

[21] Appl. No.: 63,828

[22] Filed: Aug. 6, 1979

[51] Int. Cl.³ .............................................. F16H 7/12
[52] U.S. Cl. ..................................................... 474/110
[58] Field of Search ............. 74/242.1 FD, 242.11 R, 74/242.11 C, 242.14 R, 242.15 R; 474/18, 28, 51, 103, 104, 110

[56] References Cited

U.S. PATENT DOCUMENTS

| | | | |
|---|---|---|---|
| 2,002,081 | 5/1935 | Dow | 74/242.1 FP |
| 2,051,488 | 8/1936 | Kottlowski et al. | 74/242.11 R |
| 2,703,019 | 3/1955 | Burawoy | 74/242.11 A |
| 2,893,255 | 7/1959 | Bayliss | 74/242.8 |
| 3,132,596 | 5/1964 | Dinger | 74/242.1 FP |
| 3,142,193 | 7/1964 | Polko et al. | 74/242.11 R |
| 3,413,866 | 12/1968 | Ford | 74/242.11 R |
| 3,631,734 | 1/1972 | Wagner | 74/242.11 R |
| 3,768,324 | 10/1973 | Vanderstegen-Drake | 74/242.15 R |
| 3,812,733 | 5/1974 | Yoshida | 74/242.11 S |
| 3,924,483 | 12/1975 | Walker et al. | 74/242.11 R |
| 3,965,768 | 6/1976 | Foster | 74/242.15 R |
| 3,975,965 | 8/1976 | Speer | 74/242.15 R |
| 3,986,407 | 10/1976 | Naggert | 74/242.1 FP |
| 4,077,272 | 3/1978 | Busso | 74/242.1 FP |
| 4,094,205 | 6/1978 | Cook | 74/242.1 FP |
| 4,144,772 | 3/1979 | Brackin et al. | 74/242.15 R |

Primary Examiner—C. J. Husar
Assistant Examiner—Conrad Berman
Attorney, Agent, or Firm—Frease & Bishop

[57] ABSTRACT

A hydraulic tensioning device for maintaining a predetermined amount of tensioning force on an endless drive belt for the vehicle accessories drive system. A self-contained hydraulic fluid supply and pump assembly is mounted on the swinging end of a pivotally mounted lever and is moved toward the drive belt by a hydraulically actuated piston which is mounted in a fixed position on the engine. An idler pulley is rotatably mounted on the fluid supply and pump assembly and is engaged with and driven by the drive belt. The drive belt rotates the idler pulley which hydraulically actuates the piston by driving the pump which supplies hydraulic fluid to the piston from the fluid supply. The piston pivots the lever toward the belt whereupon the idler pulley engages the belt and exerts the desired tensioning force on the belt. Check valves in the pump assembly regulate the amount of hydraulic force applied to the piston and ultimately to the belt. A partition member is slidably mounted within the piston cylinder and compensates for small oil leaks in the piston by reducing the effective volume of the cylinder chamber to maintain a constant tensioning force on the belt tensioning lever when the engine is shut off.

18 Claims, 10 Drawing Figures

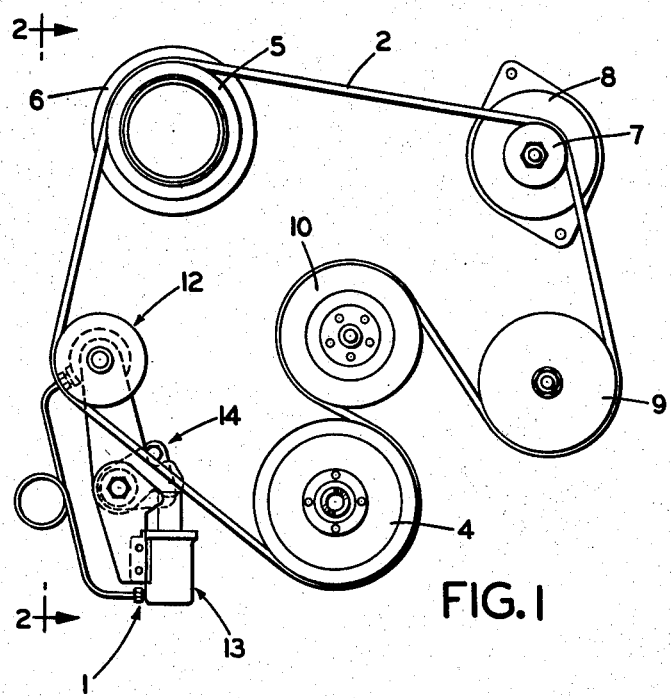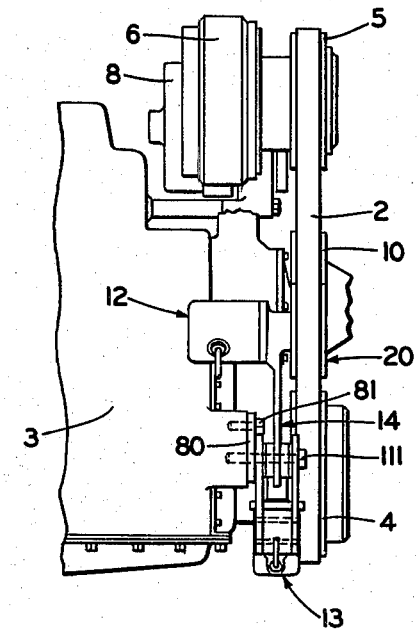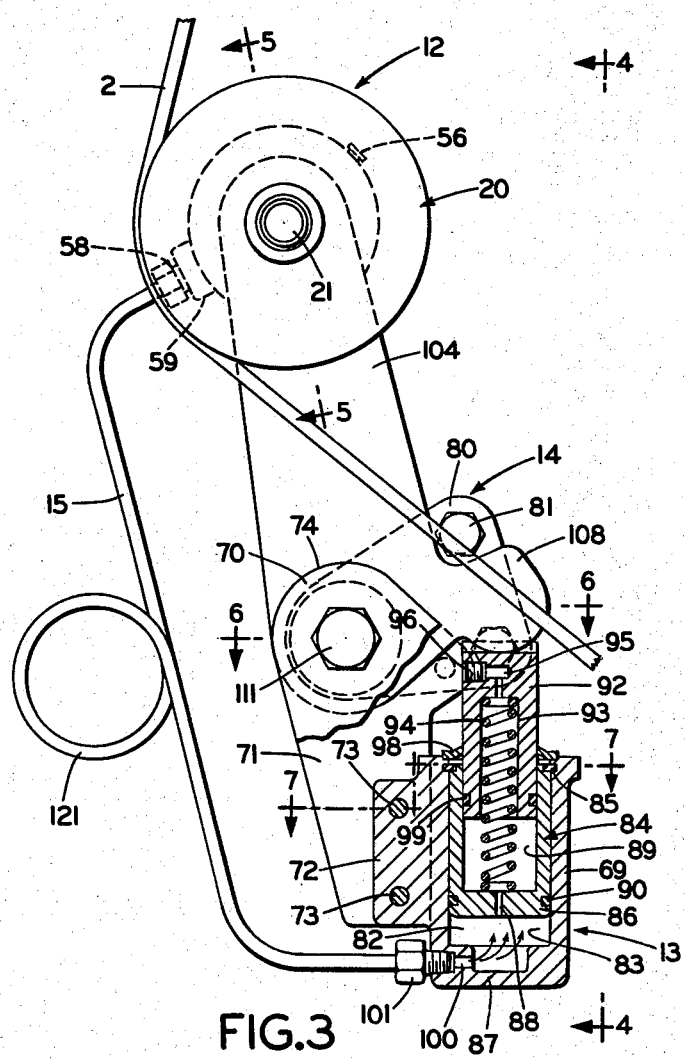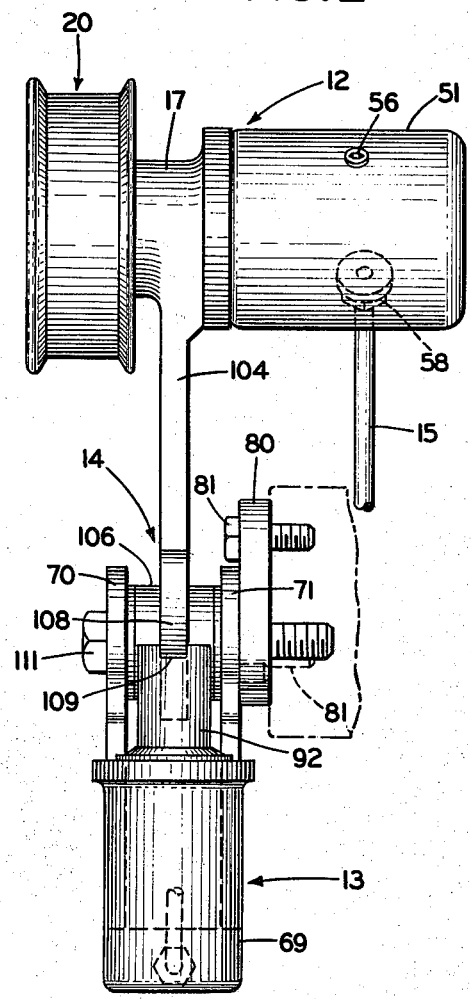
FIG.1
FIG.2
FIG.3
FIG.4

HYDRAULIC BELT TENSIONER CONSTRUCTION

BACKGROUND OF THE INVENTION

1. Field of the Invention

The invention relates to belt tensioning devices and arrangements, and in particular to a hydraulically actuated device for tensioning the endless drive belt of the drive system for vehicle accessories. More particularly, the invention relates to a belt tensioner having a self-contained hydraulic fluid supply-idler pulley-pump assembly driven by the endless belt, which maintains a predetermined constant tensioning force an the endless drive belt regardless of the engine operating condition.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To insure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch, which will affect the operating characteristics of the driven accessories. Therefore, it is desirable that an automatic belt tensioning device be used for these endless belts to provide reliable service over an extended period of time and to maintain a constant amount of tension thereof regardless of the amount of belt stretch without requiring any maintenance or manual adjustment.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use springs for applying and/or maintaining the tensioning force on a belt-engaging idler pulley or chain-engaging sprocket. Some examples of these types of constructions are shown in U.S. Pat. Nos. 2,703,019, 2,893,255, 3,413,866, 3,631,734, 3,768,324, 3,812,733, 3,924,483 and 3,965,768. Some of these various spring-actuated devices use the biasing force of the spring in combination with hydraulic actuated members for regulating the amount of tensioning force applied to the belt, depending on whether the engine is running or shut off.

U.S. Pat. No. 2,051,488 shows a chain tensioning device in which a hydraulic cylinder is actuated when the engine is running to reduce the tensioning pressure which is exerted on the drive chain by a biasing spring. This hydraulic cylinder applies a counter force to the biasing action of the spring when the engine is running in order to decrease the tensioning force on the chain, whereupon the full biasing force of the spring is exerted on the chain when the engine is off and the hydraulic cylinder inactive. U.S. Pat. No. 3,142,193 discloses another belt tensioner using a hydraulically actuated bellcrank and belt-engaging pulley in which a spring biases the pulley into tensioning engagement with the belt until the engine is operating, whereupon the hydraulic actuated piston imparts a greater tensioning force to the pulley through the bellcrank. When the engine stops, the piston retracts and the spring maintains a lesser tensioning force on the belt.

U.S. Pat. No. 4,077,272 discloses another belt tensioner using both a spring and a hydraulic member to achieve the desired tensioning characteristics. In this device, when the engine is running, hydraulic oil from the engine lubricating system forces a piston back into its cylinder to overcome an internally mounted first spring so that only a second spring acts on the belt tensioning pulley when the engine is operating. When the engine is off, both springs act on the belt tensioning pulley. U.S. Pat. No. 3,132,596 shows a belt tensioner using a hydrostatic snubber controlled by the power steering pump of the vehicle, whereupon the snubber is forced outwardly in direct relationship to the output pressure of the power steering pump. This mechanism does not maintain a constant pressure on the belt when the vehicle engine is both on and off, and will apply different forces in relationship to the engine speed.

Many of these devices are believed to perform satisfactorily for their intended purpose. However, the use of springs for applying the tensioning force on a drive belt or chain, either for applying or retracting a tensioning member therefrom, presents problems. The operating characteristics of these springs will change over the life of the spring and even in response to changes in ambient temperature. Also, as the drive belt stretches, the spring's biasing effect changes, making it difficult to maintain a constant tensioning force on the drive belt. Likewise, the springs may become rusted and corroded and break during the life of the vehicle, presenting mechanical maintenance problems for the vehicle owner.

Many of these problems are believed to be eliminated by the improved hydraulic belt tensioner constructions shown in a copending application of Nolte V. Sproul, Ser. No. 058,362, filed July 18, 1979, and my copending application, Ser. No. 060,903, filed July 26, 1979, both assigned to the same assignee as is the present application. These improved belt tensioners are operated by hydraulic pressure exerted by fluid from the vehicle engine, such as the relatively low fluid pressure of the engine's oil lubricating system or the high fluid pressure developed by the power steering pump of the vehicle.

However, some vehicle manufacturers prefer not to use the hydraulic fluid which is used for other purposes in the engine, such as lubricating or power steering, for the operation of the belt tensioner. This objection is believed to be eliminated by providing a hydraulic belt tensioner having its own self-contained hydraulic fluid reservoir and supply, such as shown in my copending application, Ser. No. 063,205, filed Aug. 3, 1979. This improved tensioner operates in conjunction with a pivotally mounted accessory for tensioning the drive belt. Again, some vehicle manufacturers desire a belt tensioning device which can be mounted as a complete unit on the engine and automatically tension the drive belt without the need of pivotally mounting one of the vehicle accessories. This provides a certain amount of flexibility in engine design since the tensioning unit may be mounted at various locations for engaging the belt and does not rely on the pivotal mounting of one of the accessories.

Accordingly, it is desirable to provide a belt tensioning device and arrangement which eliminates the use of springs for controlling the belt tensioning force, which device will maintain a constant predetermined tension on the belt throughout the belt life and regardless of whether the engine is on or off or being driven at high or low speeds, which device uses a source of hydraulic fluid completely independent of the vehicle hydraulic system for its operation, and which does not require movement of one of the vehicle accessories for tensioning the drive belt which is operatively engaged with said accessory.

There is no known belt tensioning device or arrangement of which I am aware which imparts and maintains a nearly constant predetermined tensioning force on an endless drive belt by a hydraulic piston which is actuated by hydraulic fluid from a self-contained fluid supply reservoir completely independent of the vehicle hydraulic fluid system, which maintains this constant pressure on the belt whether the engine is on or off or operating at various speeds, which prevents belt whip and achieves a highly efficient damping effect, and which does not require movement of one of the vehicle accessories to achieve the tensioning effect.

SUMMARY OF THE INVENTION

Objectives of the invention include providing a hydraulic belt tensioner construction which is actuated from a source of hydraulic fluid completely separate and independent of the vehicle accessory drive system and at a predetermined pressure regardless of the operating condition of the vehicle's engine. Another object is to provide a belt tensioner which uses a hydraulic piston for pivotally moving a lever mounted on the piston cylinder to tension the drive belt which is engaged with an idler pulley that is rotatably mounted on and operatively engaged with a self-contained fluid supply and pump assembly mounted on the swinging end of the lever. A further object is to provide a belt tensioner which has a check valve system which prevents the escape of hydraulic fluid from the piston cylinder to maintain constant pressure on the piston, thereby providing a damping effect and eliminating belt whip upon starting and stopping of the vehicle engine or upon rapid engine acceleration or deceleration. Another object is to provide a belt tensioner in which the hydraulic piston has a partition sleeve slidably mounted within the piston cylinder and dividing the cylinder chamber into a pair of subchambers with the piston rod being slidably mounted in one of the subchambers, whereupon when the vehicle engine is shut off, a spring will move the partition sleeve further into the other subchamber to maintain the piston rod receiving chamber filled with oil to compensate for minor oil leaks, thereby maintaining the constant predetermined hydraulic force on the piston rod. It is also an object of the invention to provide a belt tensioner having a self-contained supply of hydraulic fluid which is separate from the engine lubricating fluid or power steering fluid, and in which this fluid is pumped into the cylinder of the tensioning piston by a relatively inexpensive gear pump unit driven by the endless drive belt of the accessory drive system. Also, the hydraulic pressure which is exerted by the piston rod can be changed easily to conform to specific operating characteristics required by various vehicles by replacing or adjusting a simple high-pressure control check valve in the pump unit. Furthermore, the belt tensioner is of a relatively simple construction which eliminates maintenance and repair problems, which achieves the stated objectives in a simple, effective and relatively inexpensive manner, and which solves problems and satisfies needs existing in the art.

These objectives and advantages are obtained by the improved hydraulic bent tensioner construction for automatically tensioning an endless belt of the drive system for the vehicle accessories, the general nature of which may be stated as including piston means adapted to be mounted in a fixed position with respect to the endless drive belt with lever means operatively engaged by the piston means for moving said lever means toward the drive belt. Tensioning assembly means is mounted on the lever means and is adapted to be moved into engagement with the drive belt upon movement of the lever means by the piston means. The tensioning means includes pump means, reservoir means for containing a supply of hydraulic fluid, and pulley means drivingly engaged with the pump means. The pulley means is adapted to be engaged with and driven by the drive belt for actuating the pump means to supply hydraulic fluid from the reservoir means to the piston means to actuated the piston means and move the lever means to bring the tensioning assembly means into engagement with the drive belt.

BRIEF DESCRIPTION OF THE DRAWINGS

A preferred embodiment of the invention—illustrative of the best mode in which applicant has contemplated applying the principle—is set forth in the following description and shown in the accompanying drawings, and is particularly and distinctly pointed out and set forth in the appended claims.

FIG. 1 is a diagrammatic view looking toward the front of an engine, illustrating an endless drive belt operatively engaged in a driving relationship with the vehicle accessories with the improved belt tensioner construction operatively engaged with the drive belt;

FIG. 2 is a fragmentary left-hand end view of the engine and drive system looking in the direction of arrows 2—2, FIG. 1;

FIG. 3 is an enlarged view of the improved hydraulic belt tensioner construction operatively engaged with the endless drive belt, with portions of the tensioner construction shown in section and broken away;

FIG. 4 is a right-hand end view of the improved hydraulic belt tensioner construction looking in the direction of arrows 4—4, FIG. 3, with the drive belt removed therefrom;

Similar numerals refer to similar parts throughout the drawings.

DESCRIPTION OF THE PREFERRED EMBODIMENT

Figure 5:
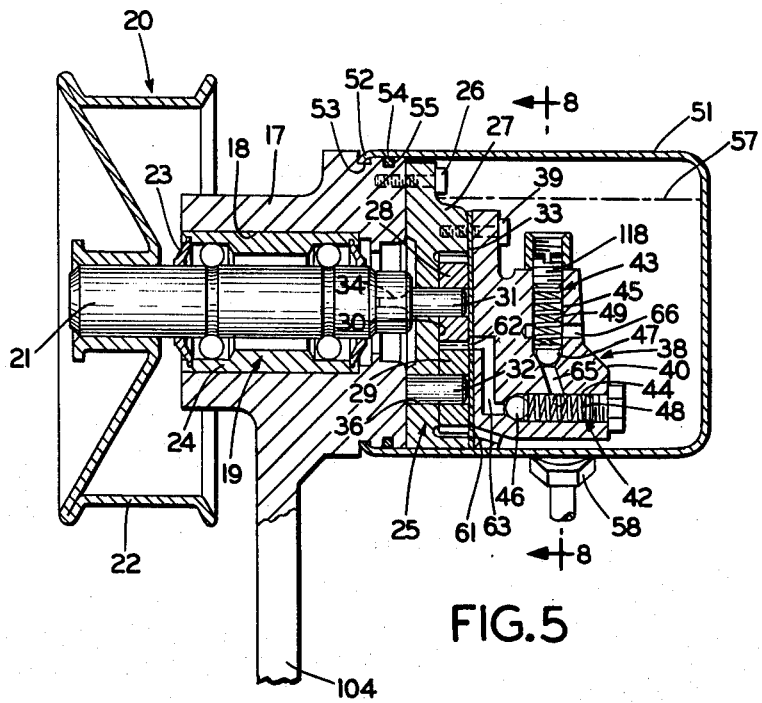
FIG. 5 is an enlarged fragmentary sectional view taken on line 5—5, FIG. 3, of the fluid supply-idler pulley-pump assembly.

Referring to FIG. 1 of the drawings, the improved belt tensioner construction is indicated generally at 1, and is shown tensioning an endless drive belt 2 of a power transmission belt drive system for the vehicle accessories. The drive system consists of a plurality of belt pulleys or sheaves having configurations and diameters determined by their associated engine accessories and locations relative to each other. The various pulleys are supported on their respective engine accessories which are mounted on engine 3 in a usual manner known in the art. Preferably, belt 2 operates in a single vertical plane which eliminates binding and skewing of drive belt 2, as shown in FIG. 2.

The engine accessories drive system consists of a main driving pulley 4 which is operatively connected to the main shaft of engine 3, a pulley 5 which is operatively connected to the air conditioning motor 6, a pulley 7 which is operatively connected to an alternator 8 which provides the electrical power for the engine, a pulley 9 which is operatively connected to the vehicle's power steering unit, and a pulley 10 which is operatively connected to the engine water pump.

Improved belt tensioner 1 includes as main components a self-contained fluid supply-idler pulley-pump assembly, a hydraulically actuated piston, and a lever mechanism, indicated generally at 12, 13 and 14, respectively, and shown in assembled condition particularly in FIGS. 3 and 4. Assembly 12 is hydraulically connected to piston 13 by a section of conduit 15. Assembly 12 is mounted on an extended end of lever mechanism 14, and is moved into tensioning engagement with belt 2 upon hydraulic actuation of piston 13, which moves lever mechanism 14 toward tensioning engagement with belt 2.

The fluid supply-idler pulley-pump assembly 12 is generally similar to the self-contained hydraulic fluid-idler pulley-pump assembly shown and described in my copending application, Ser. No. 063,205, filed Aug. 3, 1979. Assembly 12 includes a generally cylindrical-shaped bearing housing 17 (FIG. 5) having a central bore 18 with a bearing 19 mounted within bore 18. An idler pulley, indicated generally at 20, is mounted in a fixed relationship on the outer end of a shaft 21, which is rotatably mounted on bearing 19. Idler pulley 20 includes a usual, preferably sheet metal, belt engaging pulley member 22. Bearing 19 includes a pair of end sealing caps 23 which are mounted on an outer bearing race 24 with shaft 21 projecting through central openings formed in caps 23.

A gear pump unit, indicated generally at 25, is mounted on the inner wall surface of bearing housing 17 by a plurality of circumferentially spaced bolts 26. Pump unit 25 includes a generally disc-shaped gear mounting block 27 and a pair of pump gears 28 and 29, rotatably mounted within a central recess 30 formed in block 27 by stub shafts 31 and 32, respectively. Gears 28 and 29 are enclosed within recess 30 by an end sealing plate 33.

Gear 28 is the driving gear of the gear pump pair and is attached to stub shaft 31 for rotation therewith. Shaft 31 has a reduced end 34 which is located in a complementary-shaped hole formed in the inner end of pulley shaft 21, whereby rotation of pulley shaft 21 will drive gear pump shaft 31, and correspondingly, will drive pump gear 28. Pulley shaft 21 is rotated by the engagement of drive belt 2 with pulley member 22. Gear stub shaft 32 is freely rotatably mounted within an opening 36 formed in gear mounting block 27, enabling pump gear 29 to be driven by and in unison with driving gear 28. Pump unit 25 may have other configurations then the two-shafted, externally meshing gear arrangement, described above and shown in FIG. 5 without affecting the concept of the invention. Pump unit 25 is a readily available and known structure which provides a source of fluid pressure from an adjacent fluid supply reservoir, as described below.

A check valve assembly, indicated generally at 38, is mounted on gear pump mounting block 27 by a plurality of spaced bolts 39 which clamp assembly 38 against end sealing plate 33 of pump unit 25. Check valve assembly 38 preferably is formed from a rigid block of material 40, such as metal or plastic. A pair of ball check valves 42 and 43 are formed in valve block 40 to control the flow of hydraulic fluid into and out of piston 13, and correspondingly, to regulate the amount of hydraulic pressure exerted on lever mechanism 14 for tensioning belt 2. Check valves 42–43 include cavities 44 and 45 containing valve balls 46 and 47 which are biased toward seated position by springs 48 and 49, respectively. Check valves 42–43 may be of another type or arrangement, if desired, without affecting the concept of the invention.

Assembly 12 includes its own hydraulic fluid supply for supplying the hydraulic pressure and fluid to piston 13, completely eliminating the need for using hydraulic fluid from any part or component of the vehicle. A cylindrical-shaped fluid reservoir housing 51, preferably formed of plastic or sheet metal, is mounted on bearing housing 17 by various types of attachment means, such as the use of rolled outer end edges 52, seated within an annular groove 53 formed in the outer surface of bearing housing 17. A sealing ring 54 is mounted within an annular groove 55 formed in bearing housing 17 to provide a fluid seal between the cylindrical wall of housing 51 and the outer surface of bearing housing 17.

Figure 8:
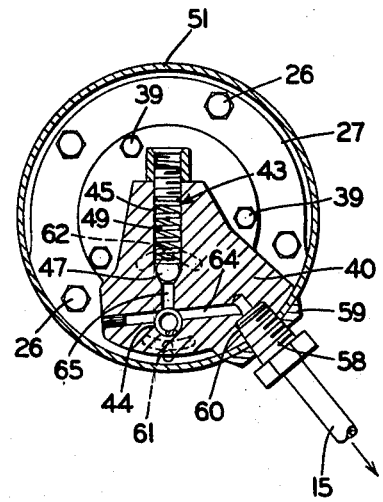
FIG. 8 is a sectional view taken on line 8—8, FIG. 5.

A supply of hydraulic fluid, such as oil 57, is contained within reservoir housing 51. Housing 51 preferably will contain sufficient fluid due to the closed loop arrangement of the improved belt tensioner construction to eliminate replacing or refilling the housing at any time throughout the life of belt tensioner 1. If desired, a removable filler cap 56 may be provided in reservoir housing 51 for filling the same with hydraulic fluid. Housing 51 also may be attached to valve block 40 (FIG. 8) by a threaded coupling 58 of conduit 15. Coupling 58 is threadably engaged in a boss 59 formed on the outer surface of fluid housing 51 and in a corresponding threaded opening 60 formed in valve block 40 to clamp fluid housing 51 and block 40 tightly together.

Valve block 40 is formed with a fluid inlet opening 61 in the lower portion of sealing plate 33, which communicates with pump gear 29. A high pressure discharge opening 62 is formed in sealing plate 33 at the meshing area between pump gears 28 and 29 and communicates with a discharge passage 63 which is connected with cavity 44 of check valve 42. A discharge outlet passage 64 extends between and communicates with conduit 15 and check valve cavity 44, whereby high pressure oil discharged from pump unit 25 unseats valve ball 46 and flows through passages 63 and 64 and into conduit 15. A bypass passage 65 communicates with and extends between check valve cavities 44 and 45 with a second bypass passage 66 extending between check valve cavity 45 and the adjacent oil reservoir. The features and operation of these check valves and associated passages are described in greater detail below.

Figure 9:
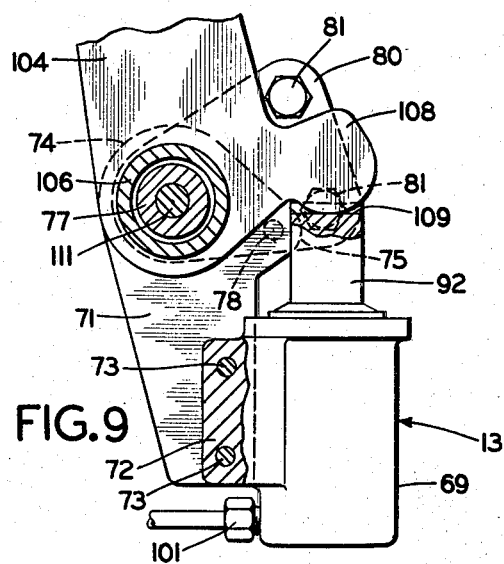
FIG. 9 is a reduced, fragmentary sectional view taken on line 9—9, FIG. 6.

Hydraulic piston 13 (FIGS. 3 and 9) includes a generally cylindrical-shaped cylinder housing 69 which is adapted to be mounted in a fixed position with respect to the vehicle engine by a pair of mounting plates 70 and 71. Plates 70-71 are attached to a boss 72 which is formed integrally with housing 69 by a pair of pins 73. Mounting plates 70-71 have curved top edges 74 which terminate in a curved projection 75. A pair of aligned circular holes 76 are formed in plates 70-71 (FIG. 6) for receiving the reduced ends of a shaft sleeve 77. An alignment pin 78 is mounted on and extends outwardly from mounting plate 71 and is received within a complementary-shaped hole 79 formed in an engine mounting plate 80. Plate 80 is attached to engine 3 by a pair of bolts 81 (FIGS. 3, 4 and 9) and by a bolt 111 which functions as the pivot bolt for lever mechanism 14.

In accordance with one of the features of the invention, cylinder housing 69 is formed with a hollow interior which forms a main piston chamber 83 (FIG. 3). A cup-shaped partition member 84 is telescopically slidably mounted within chamber 83 and is retained therein by an upper retaining ring 85 which is seated within an annular groove formed adjacent the open top of cylinder housing 69. Bottom wall 86 of partition member 84 if formed with an axially extending hole 88. Partition member 84 forms a lower subchamber 82 which is located between bottom wall 87 of cylinder housing 69 and bottom wall 86 of partition member 84. The hollow interior of partition member 84 forms a second subchamber 89 which communicates with lower subchamber 82 by hole 88 in bottom wall 86. Subchamber 89 has a smaller internal diameter than the internal diameter of subchamber 82. An annular O-ring 90 forms a seal between partition member 84 and the inner surface of cylinder housing 69.

A piston rod 92 is slidably mounted within subchamber 89 of partition member 84 and is adapted to move outwardly therefrom when acted upon by hydraulic fluid from assembly 12. Rod 92 is formed with an axial bore 93 which extends partially through rod 92. A coil spring 94 is mounted in bore 93 and is in abutment with the inside surface of bottom wall 86 of partition member 84 and biases rod 92 and partition member 84 away from each other.

A fluid exhaust port 95 is formed in the outer portion of piston rod 92 and provides communication between the surrounding atmosphere and subchamber 89 for the bleedoff of air trapped in piston 13 during the filling of piston 13 with hydraulic fluid. A removably plug 96 closes the outlet of exhaust port 95. A flexible sealing ring 98 and an internal O-ring 99 provide fluid-sealing means between piston rod 92 and cylinder housing 69 and partition member 84, respectively. An inlet port 100 is formed in the bottom of cylinder housing 69 and threadably receives a conduit coupler 101 therein, operatively connecting fluid supply conduit 15 with main piston chamber 83 (FIG. 3).

The particular construction of piston 13, having the slidable partition member 84 therein which forms the pair of subchambers 82 and 89, enables a constant tensioning force to be maintained on belt 2 when the engine is shut off, even if minor oil leaks should occur between piston rod 92 and cylinder housing 69. When the vehicle engine is shut off, the oil is trapped in subchambers 82 and 89 by check valve 42. Should any oil escape from within subchamber 89, spring 94 forces partition member 84 downwardly toward the bottom wall 87 of main cylinder chamber 83 since lever projection 108 acts as an abutment preventing upward movement of piston rod 92. This downward movement of partition member 84 forces oil trapped within subchamber 82 upwardly through hole 88 and into subchamber 89. Due to the decrease in volume of the available space within piston housing 69 since subchamber 89 has a smaller diameter than subchamber 82, this oil transfer enables the pressure on piston rod 92 to be maintained constant at the predetermined level, even though a slight amount of oil may have escaped from the cylinder. Downward movement of partition member 84 merely reduces the volume available within cylinder 69 by the radial wall thickness of partition member 84.

Lever mechanism 14 includes a generally flat strip of rigid metal material forming a lever 104, the extended end of which is integrally connected to and formed as a part of bearing housing 17, as shown in FIGS. 4 and 5, so that assembly 12 will move in unison with the extended lever end. The opposite end of lever 104 is formed with a circular opening 105 (FIG. 6) and has a cylindrical sleeve 106 telescopically mounted therein and attached by peened metal areas 107, or by welding, brazing, or other attachment means. A somewhat circular projection 108 is formed integrally with the bottom end of lever 104 (FIG. 9) and extends outwardly with respect to opening 105 and is located within a slot 109 formed in the outer end of piston rod 92. This engagement of lever projection 108 with piston rod 92 will pivot lever 104 in a counterclockwise direction upon the outward movement of rod 92.

Figure 6:
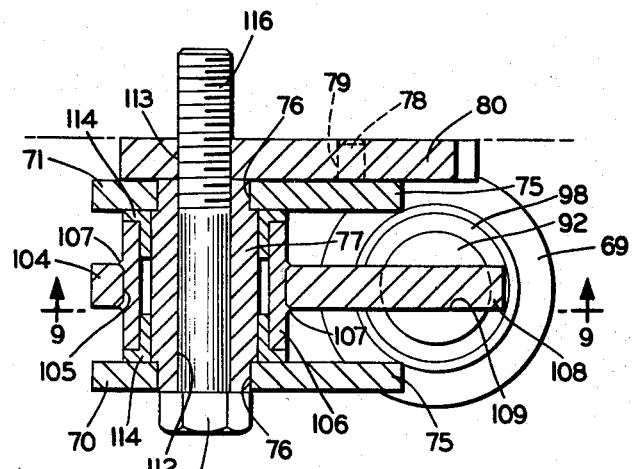
FIG. 6 is an enlarged sectional view taken on line 6—6, FIG. 3.
Figure 7:
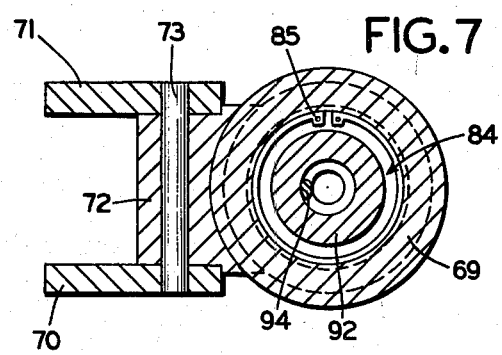
FIG. 7 is an enlarged sectional view taken on line 7—7, FIG. 3.

Lever 104 is pivotally mounted with respect to piston 13 by bolt 111. Bolt 111 extends through bore 112 of shaft sleeve 77 and through a complementary-shaped hole 113 formed in engine mounting plate 80 (FIG. 6). A pair of bushings 114 are telescopically mounted on the ends of shaft sleeve 77 and provide the bearing surfaces for rotation of lever 104 with respect to shaft sleeve 77 and between the ends of lever sleeve 106 and mounting plates 70 and 71. Thus, lever 104 is pivotally mounted between spaced plates 70 and 71 on shaft leeve 77 and pivot bolt 111. Threaded end 116 of bolt 111 is engaged in a complementary threaded hole formed in engine 3 (FIGS. 2 and 4) to assist in mounting tensioner 1 thereon. Shaft sleeve 77 preferably has a force fit engagement within holes 76 of mounting plates 70 and 71 so as to be firmly attached to the plates.

Figure 10:
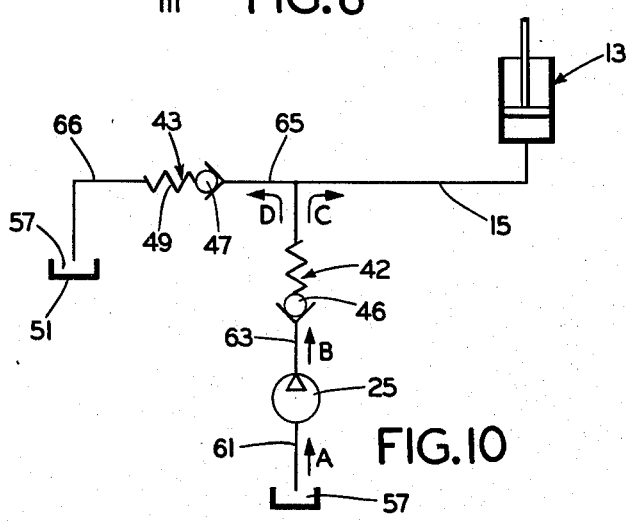
FIG. 10 is a schematic diagram of the hydraulic system of the improved belt tensioner construction.

FIG. 10 is a schematic drawing of the check valve and hydraulic fluid system of improved belt tensioner 1, with the various numerals used in FIG. 10 corresponding to the numerals of the components described above and shown particularly in FIGS. 3, 5 and 8. Low pressure oil is drawn from fluid supply 57 (arrow A) through passage 61 and is expelled by pump unit 25 as high pressure fluid (arrow B), which flows through passage 63 and through check valve 42. This flow of high pressure fluid (arrow B) will then flow either into piston 13 through conduit 15 (arrow C) or, if no additional hydraulic fluid is required for piston 13, it will flow through relief passage 65, check valve 43, and bypass passage 66 back into fluid supply 57 (arrow D).

The operation of improved belt tensioner construction 1 is described below. The amount of tensioning force which is necessary for proper tensioning of belt 2 is determined by various standard calculations and know-how in the belt tensioning field. This calculated force then is used to determine the corresponding outward force required to be exerted by piston rod 92 on lever projection 108, depending upon the respective movement arms of projections 108 and lever 104. Knowing the amount of force required to be exerted by piston rod 92, the hydraulic pressure required then can be determined since the force exerted by rod 92 is equal to the hydraulic pressure times the effective area on which the pressure acts. Spring 49 of check valve 43 then is chosen or adjusted in valve block 40 due to the threaded engagement of its retaining plug 118 therein so as to become unseated and move upwardly to an upper position when the pressure exceeds the predetermined fluid pressure required to act on piston rod 92 to produce the required force on piston rod 92.

Opening of check valve 43 enables high pressure fluid from pump unit 25 to return to fluid supply 57 through passage 66. Thus, high pressure fluid discharged by pump unit 25 will continue to flow into piston chamber 83 through check valve 42, which requires only a very small amount of pressure to unseat its valve ball 46, until the desired pressure is reached. After this pressure is obtained, any additional high pressure fluid discharged from pump unit 25 will overcome the biasing force of spring 49 and unseat valve ball 47 with the excess oil returning to supply 57. Pump unit 25 continuously operates when the vehicle engine is running due to the driving engagement of pulley member 22 with belt 2 and the driving engagement of pulley shaft 21 with gear pump stub shaft 31.

As discussed above, the improved construction of piston 13 and, in particular, movable partition member 84, will automatically compensate for minor fluid leaks to maintain the constant pressure on piston rod 92 and correspondingly on belt 2. Immediately upon actuation of pump unit 25 by belt 2 when the engine is started, any additional makeup fluid which may be required will be pumped into cylinder chamber 83 until the predetermined pressure is achieved on piston rod 92.

Conduit 15 may be formed of thin wall metal tubing and be provided with a loop 121 to permit flexing of conduit 15 without stressing the same upon swinging movement of assembly 12. Conduit 15 also can be a flexible hose or the like, if desired, without affecting the concept of the invention or operation of improved belt tensioner 1.

Improved hydraulic belt tensioner 1 and its arrangement and operation with endless drive belt 2, has a number of advantages. The self-contained fluid supply-idler pulley-pump assembly 12 completely eliminates the use of the engine lubricating fluid or the power steering fluid for operation of piston 13, as heretofore required in prior constructions. Belt tensioner 1 provides a compact unit which is mounted on the engine at a convenient location for engagement with a section of belt 2 without affecting the mounting or locations of any of the vehicle accessories. Another advantage is that partition member 84 in cylinder chamber 83 automatically compensates for minor oil leaks occurring in piston 13 to maintain constant pressure on rod 92 upon engine shut off.

The particular check valve arrangement also ensures that the desired amount of hydraulic fluid and pressure is always exerted on piston rod 92 since pump unit 25 continuously creates a supply of high pressure fluid in cylinder chamber 83 during engine operation. This fluid will only be supplied to piston 13 when necessary and usually will flow through check valve 43 and be returned to the fluid supply in reservoir housing 51. Check valve 42 will trap the hydraulic fluid in piston 13 and connecting conduit 15 when the engine is shut off. Therefore, piston rod 92 will continue to exert the full amount of pressure on lever projection 108 even when the engine is off, since the fluid will not drain from the piston during engine shut off as in prior art tensioner constructions. The maintaining of the desired tensioning force on belt 2 by the hydraulic pressure, even when the engine is not running, is desirable to prevent a whipping action from occurring upon engine start-up, provides a damping effect at all times to the piston to prevent whipping of the belt during sudden engine acceleration or deceleration, and provides satisfactory accessory operation upon engine start-up.

Improved tensioner construction 1 also enables maintenance to be performed easily on belt 2 or on any of the accessories operated thereby. Sufficient hydraulic fluid is drained from piston 13 by temporary removal of piston rod plug 96, enabling lever 104 to be manually rotated in a clockwise direction for removal and/or installation of belt 2. Hydraulic fluid will be replaced in piston chamber 83 immediately when the engine is started. Plug 96 then will be replaced as soon as all air trapped in chamber 83 has been expelled through exhaust port 95.

Accordingly, the improved belt tensioner and its arrangement provides a construction which is simplified, effective, safe and inexpensive, which achieves all of the enumerated objectives, provides for eliminating difficulties encountered with prior tensioning devices, and solves problems and obtains new results in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved hydraulic belt tensioner construction is constructed, assembled and operated, the characteristics of the new construction, and the advantageous, new and useful results obtained; the new and useful structures, devices, elements, arrangements, parts, and combinations are set forth in the appended claims.

I claim:

1. A hydraulic belt tensioner construction for automatically tensioning an endless belt of the drive system for vehicle accessories, said tensioner construction including:
    (a) piston means adapted to be mounted in a fixed position with respect to the endless drive belt;
    (b) lever means operatively engaged and moved by the piston means toward the drive belt;
    (c) tensioning assembly means mounted on the lever means and adapted to be moved into engagement with the drive belt upon movement of the lever means by the piston means; and
    (d) the tensioning assembly means including pump means, reservoir means for containing a supply of hydraulic fluid, and pulley means drivingly engaged with the pump means, said pulley means being adapted to be engaged with and driven by the drive belt for actuating the pump means to supply hdyraulic fluid from the reservoir means under pressure to the piston means to actuate the piston means and move the lever means to bring the tensioning assembly means into engagement with the drive belt.

2. The belt tensioner construction defined in claim 1 in which the pulley means has a shaft and a belt-engaging pulley member fixedly mounted on said shaft; in which bearing means rotatably mounts the pulley means shaft with respect to the pump means and reservoir means; and in which the pump means is operatively connected to and driven by the pulley means shaft.

3. The belt tensioner construction defined in claim 2 in which the pump means is a gear pump having a pair of meshing gears; and in which one of said gears is drivingly engaged with and rotated by the pulley means shaft.

4. The belt tensioner construction defined in claim 1 in which a plurality of check valves operatively communicate with the pump means and reservoir means for regulating the flow of hydraulic fluid between the pump means, the reservoir means and the piston means.

5. The belt tensioner construction defined in claim 4 in which the check valves include first and second one-way check valves; in which the first check valve is located between the pump means and a high-pressure discharge opening which communicates with the piston means to trap hydraulic fluid in the piston means; and in which the second check valve is located between the high-pressure discharge opening and a return opening which communicates with the reservoir means, whereby high-pressure fluid from the pump means will flow back into the reservoir means until additional fluid is required by the piston means.

6. The belt tensioner construction defined in claim 1 in which the piston means includes a hydraulic cylinder communicating with the pump means, a partition member telescopically slidably mounted within the cylinder and dividing the cylinder into a pair of subchambers, and a piston rod telescopically slidably mounted in the partition member and movable outwardly therefrom and into engagement with the lever means by hydraulic fluid in the cylinder to move said lever means toward the drive belt.

7. The belt tensioner construction defined in claim 6 in which spring means is located within one of the subchambers and biases the partition member away from the piston rod and toward the other of said subchambers to reduce the volume within the hydraulic cylinder to compensate for minor fluid leaks in said cylinder when the engine is shut off.

8. The belt tensioner construction defined in claim 7 in which an opening is formed between the pair of subchambers to permit the flow of fluid therebetween.

9. The belt tensioner construction defined in claim 6 in which the partition member is a cup-shaped sleeve having an open top end and a closed bottom end, with the sleeve interior forming one of the subchambers; in which the piston rod is slidably mounted within the sleeve interior and extends outwardly from the open end of the sleeve; in which a coil spring is mounted within the sleeve interior and biases the sleeve away from the piston rod; and in which an opening is formed in the closed end of the sleeve to provide fluid communication between the interior of said sleeve and the other of the subchambers.

10. An arrangement for tensioning an endless drive belt of a vehicle engine accessories drive system including:
 (a) piston means mounted in a fixed position on the vehicle engine;
 (b) lever means pivotally mounted on the piston means and movable by the piston means in a belt-tensioning direction;
 (c) an assembly mounted on the lever means and movable with the lever means into engagement with the drive belt for applying a predetermined tensioning force on said belt, said assembly including:
  (i) a pump,
  (ii) a fluid reservoir mounted on the pump,
  (iii) a supply of hydraulic fluid in the reservoir communicating with the pump, and
  (iv) an idler pulley engaged with and driven by the drive belt, said pulley also being in operative driving engagement with the pump to actuate said pump to supply hydraulic fluid under pressure to the piston means from the fluid supply for actuation of said piston means; and
 (d) conduit means hydraulically connecting the pump with the piston means.

11. The arrangement defined in claim 10 in which check valve means is located within the fluid reservoir and communicates with the pump and fluid supply to regulate the flow of hydraulic fluid from the pump to the piston means.

12. The arrangement defined in claim 11 in which the check valve means includes a first one-way check valve mounted in a high-pressure discharge passage extending between a high-pressure discharge outlet of the pump and the conduit means; and in which said fist check valve permits hydraulic fluid to flow in a direction from said high-pressure discharge outlet of the pump toward and into the conduit means.

13. The arrangement defined in claim 12 in which the check valve means includes a second one-way check valve mounted in a fluid bypass passage which extends between the high-pressure discharge passage and the fluid supply reservoir; and in which said second check valve opens to permit the flow of high-pressure hydraulic fluid from the pump discharge outlet into the supply reservoir when hydraulic pressure and fluid in the piston means are at predetermined levels.

14. The arrangement defined in claim 11 in which the fluid reservoir is formed by a hollow container; in which the pump and check valve means are located within the container; and in which the conduit means communicates with the check valve means for receiving high-pressure fluid from the pump for actuation of the piston means.

15. The arrangement defined in claim 10 in which the pump includes a pair of gears; in which the idler pulley has a shaft; and in which one of the pump gears is operatively connected to the idler pulley shaft for driving said one gear which drives the other of said gears to pump fluid from the fluid supply into the piston means through the conduit means.

16. The arrangement defined in claim 10 in which the lever means includes a generally flat elongated strip of material connected to one end to the assembly and pivotally mounted at an opposite end on the piston means; and in which a projection is formed integrally with the elongated strip adjacent said opposite end and is engaged by the piston means for pivotally moving the lever means toward a belt-tensioning direction.

17. The arrangement defined in claim 10 in which the piston means includes a cylinder forming a hollow interior fluid-receiving chamber; in which a cup-shaped partition member is telescopically slidably mounted in the cylinder chamber and forms a pair of subchambers, with one of said subchambers being located within the partition member and the other of said subchambers being located in the cylinder interior beneath the partition member; in which a piston rod is telescopically slidably mounted in the said one subchamber of the partition member; and in which a spring is mounted in the partition member subchamber and biases the piston rod away from said partition member subchamber.

18. The arrangement defined in claim 17 in which an opening is formed in the partition member to provide fluid communication between the subchambers.

* * * * *

UNITED STATES PATENT AND TRADEMARK OFFICE
CERTIFICATE OF CORRECTION

PATENT NO. : 4,277,240
DATED : July 7, 1981
INVENTOR(S) : Derald H. Kraft

It is certified that error appears in the above-identified patent and that said Letters Patent are hereby corrected as shown below:

Column 1, line 14, change "an" to -on-

Column 1, line 35, change "thereof" to -thereon-

Column 4, line 13, change "bent" to -belt-

Column 6, line 7, change "then" to -than-

Column 11, line 5, change "hdyraulic" to -hydraulic-

Column 12, line 37, change "fist" to -first-

Column 12, line 66, change "connected to" to -connected at-

Signed and Sealed this

Eighth Day of September 1981

[SEAL]

Attest:

GERALD J. MOSSINGHOFF

Attesting Officer

Commissioner of Patents and Trademarks